(12) United States Patent
Miki

(10) Patent No.: US 9,190,663 B2
(45) Date of Patent: Nov. 17, 2015

(54) COMPOSITE ACTIVE MATERIAL, ALL SOLID STATE BATTERY, AND METHOD FOR PRODUCING COMPOSITE ACTIVE MATERIAL

(71) Applicant: TOYOTA JIDOSHA KABUSHIKI KAISHA, Toyota-shi, Aichi (JP)

(72) Inventor: Nariaki Miki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/356,010

(22) PCT Filed: Dec. 25, 2012

(86) PCT No.: PCT/JP2012/083516
§ 371 (c)(1),
(2) Date: May 2, 2014

(87) PCT Pub. No.: WO2013/099878
PCT Pub. Date: Jul. 4, 2013

(65) Prior Publication Data
US 2014/0302229 A1   Oct. 9, 2014

(30) Foreign Application Priority Data
Dec. 26, 2011   (JP) ................. 2011-282837

(51) Int. Cl.
*H01M 4/36* (2006.01)
*H01M 4/48* (2010.01)
*H01M 4/62* (2006.01)
*H01M 10/052* (2010.01)
*H01M 10/0562* (2010.01)
*H01M 4/04* (2006.01)
*H01M 4/1391* (2010.01)

(52) U.S. Cl.
CPC .............. *H01M 4/366* (2013.01); *H01M 4/62* (2013.01); *H01M 4/625* (2013.01); *H01M 10/052* (2013.01); *H01M 4/0471* (2013.01); *H01M 4/1391* (2013.01); *H01M 10/0562* (2013.01); *Y02E 60/122* (2013.01); *Y02T 10/7011* (2013.01)

(58) Field of Classification Search
CPC ........................ H01M 10/052; H01M 10/056
See application file for complete search history.

(56) References Cited

U.S. PATENT DOCUMENTS

| 4,028,085 A * | 6/1977 | Thomas .................... 65/17.2 |
| 2009/0081554 A1* | 3/2009 | Takada et al. ................. 429/322 |
| 2011/0086274 A1* | 4/2011 | Chang et al. .................. 429/223 |

FOREIGN PATENT DOCUMENTS

| JP | A-2003-059492 | 2/2003 |
| JP | A-2006-107963 | 4/2006 |
| JP | 2010225309 A * | 10/2010 |
| WO | WO 2007/004590 A1 | 1/2007 |

* cited by examiner

*Primary Examiner* — Lisha Jiang
(74) *Attorney, Agent, or Firm* — Oliff PLC

(57) ABSTRACT

A main object of the present invention is to provide a composite active material provided with a coating layer having satisfactory electron conductivity. The object is attained by providing a composite active material including an active material and a coating layer that is formed on the surface of the active material and contains a carbonaceous material and an ion conductive oxide, wherein the elemental carbon concentration of the coating layer surface is 17.0 atm % or more.

8 Claims, 2 Drawing Sheets

COMPOSITE ACTIVE MATERIAL, ALL SOLID STATE BATTERY, AND METHOD FOR PRODUCING COMPOSITE ACTIVE MATERIAL

TECHNICAL FIELD

The present invention relates to a composite active material which is provided with a coating layer having satisfactory electron conductivity.

BACKGROUND ART

Along with the rapid distribution of information-related equipment and telecommunication equipment such as personal computers, video cameras and mobile telephones in recent years, more emphasis is put on the development of batteries (for example, lithium batteries) that are excellent as power supplies of the equipment. Furthermore, in fields other than the information-related equipment and telecommunication equipment, for example, in the automotive industry, development of lithium batteries and the like for electric cars and hybrid cars is underway.

Here, in lithium batteries that are conventionally available in the market, since organic liquid electrolytes making use of flammable organic solvents are used, improvements in terms of structure and material are needed for the installation of safety devices that suppress temperature increase at the time of short circuits, or for the prevention of short circuits. In this regard, since an all solid state battery in which the liquid electrolyte has been changed to a solid electrolyte, does not use flammable organic solvents in the battery, it is contemplated that simplification of safety devices is promoted, and excellent production cost or productivity is attained.

In the field of such all solid state batteries, attention has been paid for a long time to the interface of an active material and a solid electrolyte material, and there have been attempts to promote an enhancement in the performance of all solid state batteries. For example, Patent Literature 1 discloses an all solid state lithium battery which uses a lithium ion conductive solid electrolyte containing a sulfide as a main component, the battery having the surface of a cathode active material coated with a lithium ion conductive oxide. This technology is intended to suppress the formation of a high resistive layer that is generated at the contact interface between a sulfide solid electrolyte and a cathode active material.

CITATION LIST

Patent Literature

Patent Literature 1: WO 2007/004590 A

SUMMARY OF INVENTION

Technical Problem

However, in order for an active material that is used in all solid state batteries to undergo a battery reaction, both properties of electron conductivity and lithium conductivity are required; however, since an ion conductive oxide (coating layer) has insufficient electron conductivity, a battery which uses an active material provided with a coating layer has a problem with high internal resistance.

Under such circumstances, the inventor of the present invention attempted to enhance electron conductivity by incorporating a carbonaceous material, in addition to an ion conductive oxide, into the coating layer. Furthermore, the inventor conducted a thorough investigation, and as a result, found the content of the carbonaceous material with which a coating layer having satisfactory electron conductivity can be obtained. The present invention is based on the finding described above.

That is, a primary object of the present invention is to provide a composite active material provided with a coating layer having satisfactory electron conductivity.

Solution to Problem

In order to solve the problems described above, according to the present invention, there is provided a composite active material comprising: an active material, and a coating layer that is formed on a surface of the active material and contains a carbonaceous material and an ion conductive oxide, characterized in that an elemental carbon concentration of a surface of the coating layer is 17.0 atm % or more.

According to the present invention, a composite active material provided with a coating layer which has satisfactory electron conductivity since the coating layer contains a carbonaceous material such that the elemental carbon concentration of the coating layer surface is 17.0 atm % or more, can be obtained. Furthermore, an increase in the internal resistance of an all solid state battery using the composite active material of the present invention can be suppressed, and a high power output all solid state battery can be obtained.

According to the present invention, it is preferable that the elemental carbon concentration of the surface of the coating layer be 36.7 atm % or less. A composite active material having a coating layer which has both satisfactory ion conductivity and satisfactory electron conductivity can be obtained.

According to the present invention, there is provided an all solid state battery comprising a cathode active material layer containing a cathode active material; an anode active material layer containing an anode active material; and a solid electrolyte layer that is formed between the cathode active material layer and the anode active material layer, characterized in that the electrode active material layer being at least one of the cathode active material layer and the anode active material layer, contains the composite active material described above, and the composite active material is in contact with a solid electrolyte material.

According to the present invention, since the electrode active material layer contains the composite active material that includes the coating layer having satisfactory electron conductivity, the all solid state battery having low internal resistance and high power output can be obtained. Furthermore, since the composite active material is in contact with the solid electrolyte material, an increase in the interface resistance of the active material and the solid electrolyte material can be effectively suppressed.

According to the present invention, there is provided a method for producing a composite active material, the composite active material comprises an active material and a coating layer that is formed on a surface of the active material and contains a carbonaceous material and an ion conductive oxide, in which an elemental carbon concentration of a surface of the coating layer being 17.0 atm % or more, the method comprising steps of: a preparation step of preparing a coating liquid for coating layer containing a compound or compounds that serve(s) as raw material of the carbonaceous material and a raw material of the ion conductive oxide; a coating film forming step of applying the coating liquid for coating layer on the surface of the active material and thereby forming a coating film; and a heat treatment step of subjecting the coating film to a heat treatment, and thereby forming the coating layer.

According to the present invention, since the composite active material in which the carbonaceous material is incorporated such that the elemental carbon concentration of the coating layer surface would be 17.0 atm % or more, the composite active material provided with the coating layer having satisfactory electron conductivity can be produced. Therefore, an increase in the internal resistance in an all solid state battery using the composite active material obtained by the production method of the present invention can be suppressed.

Advantageous Effects of Invention

According to the present invention, an operating effect that can provide a composite active material which comprises a coating layer having satisfactory electron conductivity, is offered.

DESCRIPTION OF EMBODIMENTS

Hereinafter, the composite active material, all solid state battery, and method for producing a composite active material of the present invention will be described.

A. Composite Active Material

First, the composite active material of the present invention will be described. The composite active material of the present invention comprises an active material, and a coating layer that is formed on a surface of the active material and contains a carbonaceous material and an ion conductive oxide, characterized in that the elemental carbon concentration of the coating layer surface is 17.0 atm % or more.

Figure 1:
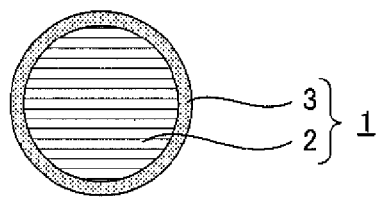
FIG. 1 is a schematic sectional view illustrating an example of a composite active material of the present invention.

FIG. 1 is a schematic sectional view illustrating an example of the composite active material of the present invention. As illustrated in FIG. 1, the composite active material 1 of the present invention comprises an active material 2, and a coating layer 3 formed on the surface of the active material 2. Furthermore, the coating layer 3 contains a carbonaceous material and an ion conductive oxide, and the elemental carbon concentration of the surface of the coating layer 3 is 17.0 atm % or more.

According to the present invention, since a carbonaceous material is incorporated such that the elemental carbon concentration of the coating layer surface would be 17.0 atm % or more, a composite active material provided with a coating layer having satisfactory electron conductivity can be obtained. Furthermore, an increase in the internal resistance of an all solid state battery using the composite active material of the present invention is suppressed, and thus a high power output battery can be obtained.

As described above, since the ion conductive oxide which is a constituent material of the coating layer has insufficient electron conductivity, as illustrated in Patent Literature 1, a composite active material having a coating layer composed only of an ion conductive oxide may have insufficient electron conductivity. Therefore, in an all solid state battery using the composite active material, formation of a high resistive layer that is generated at the interface between the active material and the solid electrolyte material, can be suppressed; however, due to the presence of the coating layer of the composite active material, there is a problem that the internal resistance of the all solid state battery cannot be lowered.

Under such circumstances, the inventor of the present invention attempted to enhance electron conductivity by incorporating a carbonaceous material, in addition to an ion conductive oxide, into the coating layer. Furthermore, the inventor conducted a thorough investigation, and as a result, the inventor found the content of the carbonaceous material with which a coating layer having satisfactory electron conductivity can be obtained. That is, in regard to a composite active material, the inventors found that when the elemental carbon concentration of the coating layer surface is 17.0 atm % or more, satisfactory electron conductivity can be exhibited.

Incidentally, the elemental carbon concentration of the coating layer surface according to the present invention is a value that can be determined by performing an analysis by X-ray photoelectron spectroscopy (XPS) under the following conditions. Specifically, an elemental carbon concentration (atm %) obtainable when the element composition ratio is calculated by X-ray photoelectron spectroscopy (XPS) for the constituent elements (provided that Li is excluded) of the coating layer and the active material of the composite active material, and carbon, as the elements to be analyzed, is designated as the elemental carbon concentration of the coating layer surface according to the present invention. Regarding the analytic apparatus, a fully automated scanning X-ray photoelectron spectroscopic analyzer (QUANTERA SXM™ manufactured by Physical Electronics, Inc, (PHI)) is used, and regarding the analysis conditions, peak shift correction was performed at C1s (284.7 eV), and then element concentrations were calculated from the peaks of the photoelectron spectra of C1s, O1s, Nb3d, Co2p, Ni2p, and Mn2p. Calculation of the element concentrations was carried out based on the following formula, using the peak intensities (peak areas) of the respective elements and the relative sensitivity coefficients thereof.

$$C = \frac{\left(\frac{I_i}{S_i}\right)}{\sum_{j=1}^{N}\left(\frac{I_j}{S_j}\right)} \times 100 \qquad \text{[Mathematical Formula 1]}$$

in which C: concentration (atom %), I: photoelectron intensity (peak area), S: relative sensitivity coefficient, subscripts "i" and "j": kinds of elements.

Hereinafter, each constituent of the composite active materials of the present invention will be described.

1. Coating Layer

The coating layer according to the present invention contains a carbonaceous material and an ion conductive oxide, and is characterized in that the elemental carbon concentration of the coating layer surface is 17.0 atm % or more.

(1) Carbonaceous Material

The carbonaceous material that is used in the coating layer will be explained. The carbonaceous material is incorporated in order to enhance electron conductivity of the coating layer. Furthermore, when a carbonaceous material is incorporated in the coating layer, in the case of using the composite active material of the present invention in an all solid state battery, the internal resistance of the all solid state battery can be decreased, and an enhancement of the power output characteristics can be promoted.

The carbonaceous material is not particularly limited as long as it is formed of carbon element, and for example, the carbonaceous material may be a carbonaceous material having a crystalline structure, or may be a carbonaceous material having a non-crystalline structure (amorphous structure) (amorphous carbon). Incidentally, it is contemplated that the difference in the structure of the carbonaceous material is attributed to the temperature at the time of the heat treatment step described in section "C. Method for producing composite active material" that will be described below. That is, it is thought that when the heat treatment step is carried out at a high temperature (for example, about 1000° C. to 1200° C.), a carbonaceous material having a crystalline structure is formed, and when the heat treatment step is carried out at a low temperature (for example, about 300° C. to 500° C.), a carbonaceous material having a non-crystalline structure (amorphous structure) is formed.

The shape of the carbonaceous material is not particularly limited as long as the carbonaceous material can be incorporated into the coating layer, and examples include a granular shape, a needle shape, and a fiber shape. Furthermore, the size of the carbonaceous material varies with the shape of the carbonaceous material, and the length of the longest part of the carbonaceous material is preferably in the range of 0.1 nm to 100 nm, and more preferably in the range of 1 nm to 30 nm. If the particle size is excessively smaller than the range described above, sufficient electron conductivity may not be imparted to the coating layer, and on the other hand, if the particle size is excessively larger than the range described above, Li ion conduction of the coating layer may be inhibited. Incidentally, the longest part of the carbonaceous material means the particle size in a case in which the shape of the carbonaceous material is a granular shape, and means the length of the longest side in a case in which the shape of the carbonaceous material is a needle shape, a fiber shape or the like.

Furthermore, the carbonaceous material is not particularly limited as long as it is incorporated in the coating layer; however, it is preferable that the carbonaceous material be dispersed in the coating layer, and among others, it is preferable that the carbonaceous material be in a continuous form in the coating layer. It is because when the carbonaceous material is present in a continuous form in the coating layer, electron conduction paths are formed, and high electron conductivity can be imparted to the coating layer. Specifically, a state in which the outermost surface of the composite active material is linked throughout to the interface between the coating layer and the active material, may be mentioned.

The content of the carbonaceous material at the coating layer surface is not particularly limited as long as the elemental carbon concentration of the coating layer surface is 17.0 atm % or more, but among others, a content of 24.4 atm % or more is preferred. It is because electron conductivity of the coating layer can be further enhanced.

On the other hand, it is preferable that the elemental carbon concentration of the coating layer surface be 36.7 atm % or less, and among others, 29.5 atm % or less. It is because when the elemental carbon concentration exceeds the above-described value, electron conductivity of the coating layer is enhanced, but since the proportion of the ion conductive oxide of the coating layer is relatively decreased, ion conductivity is decreased, and there is a possibility that the internal resistance of the all solid state battery may be increased. According to the present invention, when the elemental carbon concentration is adjusted to the value described above, satisfactory electron conductivity can be imparted while satisfactory ion conductivity of the coating layer is secured. Incidentally, the carbonaceous material in the coating layer can be identified by using X-ray photoelectron spectroscopy (XPS) as described above.

(2) Ion Conductive Oxide

The ion conductive oxide used in the present invention is not particularly limited, but regarding the raw material element, for example, an oxide containing at least one of at least Group 3 to Group 6 elements and Group 13 to Group 15 elements is preferred, and particularly, a lithium composite oxide containing at least one of these elements and lithium is preferred.

Specifically, among the elements of Group 3 to Group 6 and Group 13 to Group 15, an oxide containing at least one selected from B, Si, Ti, Zr, V, P, Al, Nb, Ta, Cr, Mo and W is preferred, and a lithium composite oxide containing at least one of these elements and lithium is more preferred.

More specifically, preferred examples of the ion conductive oxide include Li-containing oxides such as $LiNbO_3$, $Li_3BO_3$, $LiBO_2$, $Li_2CO_3$, $LiAlO_2$, $Li_4SiO_4$, $Li_2SiO_3$, $Li_3PO_4$, $Li_2SO_4$, $Li_2TiO_3$, $Li_4Ti_5O_{12}$, $Li_2Ti_2O_5$, $Li_2ZrO_3$, $Li_2MoO_4$ and $Li_2WO_4$, and among them, $LiNbO_3$ is more preferred.

Furthermore, the ion conductive oxide may be a composite compound of a Li-containing oxide. Regarding such a composite compound, any arbitrary combination of the Li-containing oxides described above can be employed, and examples thereof include $Li_3PO_4$—$Li_4SiO_4$, $Li_3BO_3$—$Li_4SiO_4$, and $Li_3PO_4$—$Li_4GeO_4$.

Furthermore, among the solid electrolytes used in all solid state batteries, an oxide-based solid electrolyte can also be used as an ion conductive oxide that coats the electrode active material. Specific examples include oxide-based amorphous solid electrolytes such as $Li_2O$—$B_2O_3$—$P_2O_5$, $Li_2O$—$SiO_2$, $Li_2O$—$B_2O_3$, and $Li_2O$—$B_2O_3$—$ZnO$; and crystalline oxides such as $LiI$—$Al_2O_3$, $Li_5La_3Ta_2O_{12}$, $Li_7La_3Zr_2O_{12}$, and $Li_6BaLa_2Ta_2O_{12}$.

(3) Coating Layer

The thickness of the coating layer used in the present invention is not particularly limited if, when the composite active material of the present invention is used in an all solid state battery, the thickness of the coating layer can suppress the reaction between the active material and the solid electrolyte material, and for example, the thickness is preferably in the range of 1 nm to 500 nm, and more preferably in the range of 2 nm to 100 nm. It is because if the coating layer is too thick, there is a possibility that ion conductivity and electron conductivity may be decreased, and on the other hand, if the coating layer is too thin, there is a possibility that the active material and the solid electrolyte material may react with each other. Incidentally, the thickness of the coating layer can be measured by, for example, observation by transmission electron microscopy (TEM) or the like.

The form of the coating layer is not particularly limited as long as the coating layer is formed on the surface of the active material, but for example, it is preferable that the coating layer cover the surface of the active material. The coating ratio of the coating layer of the surface of the active material is preferably higher for the purpose of suppressing an increase in the interface resistance, and specifically, the coating ratio is preferably 50% or higher, and more preferably 80% or higher. Furthermore, the coating layer may cover the entire surface of the active material. Incidentally, the coating ratio of the coating layer can be measured using, for example, transmission electron microscopy (TEM), X-ray photoelectron spectroscopy (XPS) or the like.

2. Active Material

The active material used in the present invention is not particularly limited, but in a case in which the composite active material of the present invention is used in a lithium all solid state battery, examples of the active material include lithium cobaltate ($LiCoO_2$), lithium nickelate ($LiNiO_2$), $LiNi_{1/3}Mn_{1/3}Co_{1/3}O_2$, lithium manganate ($LiMn_2O_4$), heteroelement-substituted Li—Mn spinal represented by formula: $Li_{1+x}Mn_{2-x-y}M_yO_4$ (in which x+y=2, M=at least one selected from Al, Mg, Co, Fe, Ni and Zn), lithium titanate (oxide containing Li and Ti), lithium metal phosphate ($LiMPO_4$, M=at least one selected from Fe, Mn, Co and Ni), transition metal oxides (for example, vanadium oxide ($V_2O_5$) and molybdenum oxide ($MoO_3$)), titanium sulfide ($TiS_2$), carbon materials (for example, graphite and hard carbon), lithium cobalt nitride (LiCoN), lithium silicon oxides (oxides containing Li and Si), lithium metal (Li), lithium alloys (for example, LiM; M=Sn, Si, Al, Ge, Sb, P or the like), lithium storable intermetallic compounds (for example, storable intermetallic compounds containing Mg and M; M=Sn, Ge, Sb or the like, and storable intermetallic compounds containing N and Sb; N=In, Cu, Mn or the like), and derivatives thereof.

The active material may be a cathode active material, or may be an anode active material. Incidentally, there is no clear distinction between the cathode active material and the anode active material, and a battery having an arbitrary voltage can be constructed by making a comparison between the charge-discharge potentials of two kinds of compounds, and using a compound that exhibits a noble potential in the cathode, while using a compound that exhibits a less noble potential in the anode.

In the present process, it is particularly preferable to use an oxide active material. It is because a high capacity active material can be provided. Furthermore, since an oxide active material is likely to react with a sulfide solid electrolyte material, and a high resistive layer is likely to be formed, as the composite active material of the present invention contains an oxide active material, an all solid state battery using a sulfide solid electrolyte material can be suitably used.

The shape of the active material may be, for example, a granular shape, and among others, a true spherical shape or an elliptical shape is preferred. Furthermore, when the active material has a granular shape, the average particle size is, for example, preferably in the range of 0.1 μm to 50 μm.

3. Composite Active Material

The composite active material of the present invention is, for example, used in an electrode active material layer of an all solid state battery described in the section "B. All-solid-state battery" that will be described below.

Furthermore, the method for producing a composite active material of the present invention is not particularly limited as long as it is a method capable of producing the above-described composite active material comprising an active material and a coating layer, and for example, the production method explained in the section "C. Method for producing composite active material" that will be described below can be suitably used.

B. All-Solid-State Battery

Next, the all solid state battery of the present invention will be explained. The all solid state battery of the present invention comprises a cathode active material layer containing a cathode active material; an anode active material layer containing an anode active material; and a solid electrolyte layer formed between the cathode active material layer and the anode active material layer, characterized in that the electrode active material layer being at least one of the cathode active material layer and the anode active material layer contains the composite active material described in "A. Composite active material" described above, and the composite active material is in contact with the solid electrolyte material.

Figure 2:
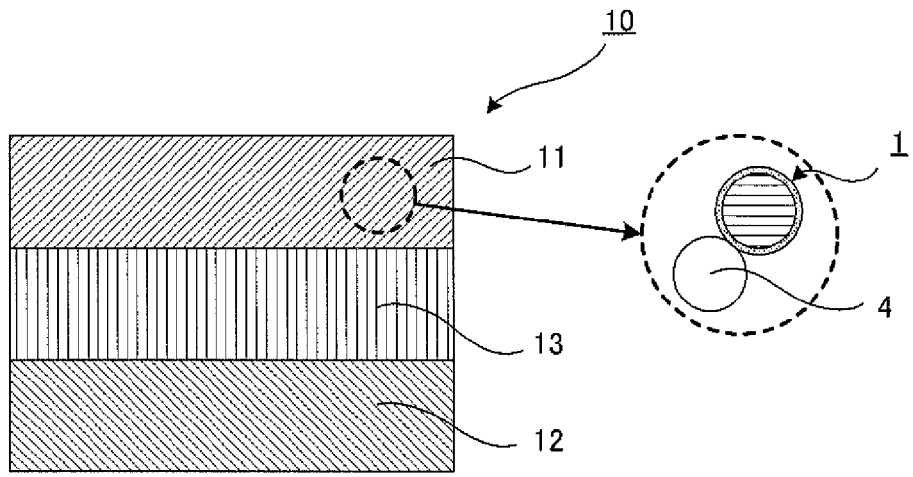
FIG. 2 is a schematic sectional view illustrating an example of an all solid state battery of the present invention.

FIG. 2 is a schematic sectional view illustrating an example of the all solid state battery of the present invention. As illustrated in FIG. 2, a power generating element 10 of the all solid state battery of the present invention comprises a cathode active material layer 11 containing a cathode active material; an anode active material layer 12 containing an anode active material; and a solid electrolyte layer 13 formed between the cathode active material layer 11 and the anode active material layer 12. Furthermore, the all solid state battery illustrated in FIG. 2 is characterized in that the cathode active material layer 11 contains a composite active material 1, and the composite active material 1 is in contact with a solid electrolyte material 4.

According to the present invention, since the electrode active material layer comprises a coating layer having satisfactory electron conductivity and contains a composite active material, an all solid state battery having low internal resistance and high power output can be obtained. Furthermore, since the composite active material is in contact with the solid electrolyte material, an increase in the interface resistance between the active material and the solid electrolyte material can be suppressed.

Hereinafter, the details of the all solid state battery of the present invention will be explained.

1. Electrode Active Material Layer

The electrode active material layer used in the present invention contains the composite active material described in the section "A. Composite active material" described above. The electrode active material layer may be at least one of the cathode active material layer and the anode active material layer, and is more preferably at least the cathode active material layer.

In regard to the composite active material contained in the electrode active material layer, since the composite active material is described in the section "A. Composite active material" described above, further description will not be repeated here. According to the present invention, among others, the composite active material is preferably a composite active material containing an oxide active material. The content of the composite active material in the electrode active material layer is, for example, preferably in the range of 10% by weight to 99% by weight, and more preferably 20% by weight to 90% by weight.

Regarding the electrode active material layer used in the present invention, it is desirable if at least one of the cathode active material layer or the anode active material layer contains the composite active material described above, the other electrode active material layer may not contain the composite active material. For example, when the cathode active material layer according to the present invention contains the composite active material, the anode active material layer is not particularly limited, and for example, the anode active material layer may be formed from a metal active material, a carbon active material and the like, without containing the composite active material. Examples of the metal active material include Li alloys, In, Al, Si and Sn. On the other hand, examples of the carbon active material include mesocarbon microbeads (MCMB), highly oriented graphite (HOPG), hard carbon, and soft carbon. The content of the active material other than the composite active material in the electrode active material layer can be adjusted to a level similar to the content of the composite active material.

Furthermore, according to the present invention, it is preferable that the electrode active material layer contain a solid electrolyte material. It is because ion conductivity of the electrode active material layer can be enhanced. According to the present invention, among solid electrolyte materials, a sulfide solid electrolyte material is preferred. Since a sulfide solid electrolyte material is highly reactive, the sulfide solid electrolyte material is likely to react with the active material described above, and is likely to form a high resistive layer between the sulfide solid electrolyte material and the active material. On the contrary, since the composite active material according to the present invention has the above-described coating layer formed on the surface of the active material, formation of a high resistive layer can be prevented, and therefore, an increase in the interface resistance between the active material and the sulfide solid electrolyte material can be effectively suppressed.

Examples of the sulfide solid electrolyte material include, when the all solid state battery of the present invention is a lithium all solid state battery, $Li_2S$—$P_2S_5$, $Li_2S$—$P_2S_5$—LiI, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that "m" and "n" represent positive numbers; and Z represents any of Ge, Zn and Ga), $Li_2S$—$GeS_2$, $Li_2S$—$SiS_2$—$Li_3PO_4$, and $Li_2S$—$SiS_2$—$Li_xMO_y$ (provided that "x" and "y" represent positive numbers; and M represents any of P, Si, Ge, B, Al, Ga and In). Incidentally, the description "$Li_2S$—$P_2S_5$" means a sulfide solid electrolyte material formed using a raw material composition containing $Li_2S$ and $P_2S_5$, and the same also applies to other descriptions.

Furthermore, when the sulfide solid electrolyte material is formed using a raw material composition containing $Li_2S$ and $P_2S_5$, the proportion of $Li_2S$ relative to the sum of $Li_2S$ and $P_2S_5$ is, for example, preferably in the range of 70 mol % to 80 mol %, more preferably in the range of 72 mol % to 78 mol %, and even more preferably in the range of 74 mol % to 76 mol %. It is because a sulfide solid electrolyte material having an ortho-composition or a composition approximating to an ortho-composition can be obtained, and a sulfide solid electrolyte having high chemical stability can be obtained. Here, the term ortho generally refers to an oxo acid having the highest degree of hydration among the oxo acids obtainable by hydrating a same oxide. According to the present invention, a crystal composition in which $Li_2S$ is added to a sulfide to the largest extent is referred to an ortho-composition. In a $Li_2S$—$P_2S_5$ system, $Li_3PS_4$ corresponds to the ortho-composition. In the case of a sulfide solid electrolyte of the $Li_2S$—$P_2S_5$ system, the proportion of $Li_2S$ and $P_2S_5$ from which the ortho-composition is obtained is such that, on a molar basis, $Li_2S$:$P_2S_5$=75:25. Incidentally, even in the case of using $Al_2S_3$ or $B_2S_3$ instead of $P_2S_5$ in the raw material composition, a preferred range is the same. In a $Li_2S$—$Al_2S_3$ system, $Li_3AlS_3$ corresponds to the ortho-composition, and in a $Li_2S$—$B_2S_3$ system, $Li_3BS_3$ corresponds to the ortho-composition.

Furthermore, when the sulfide solid electrolyte material is formed using a raw material composition containing $Li_2S$ and $SiS_2$, the proportion of $Li_2S$ relative to the sum of $Li_2S$ and $SiS_2$ is, for example, preferably in the range of 60 mol % to 72 mol %, more preferably in the range of 62 mol % to 70 mol %, and even more preferably in the range of 64 mol % to 68 mol %. It is because a sulfide solid electrolyte material having an ortho-composition or a composition approximating to an ortho-composition can be obtained, and a sulfide solid electrolyte material having high chemical stability can be obtained. In a $Li_2S$—$SiS_2$ system, $Li_4SiS_4$ corresponds to the ortho-composition. In the case of a sulfide solid electrolyte material of a $Li_2S$—$SiS_2$ system, the proportion of $Li_2S$ and $SiS_2$ to obtain the ortho-composition is such that, on a molar basis, $Li_2S$:$SiS_2$=66.7:33.3. Incidentally, even in the case of using $GeS_2$ instead of $SiS_2$ in the raw material composition, a preferred range is the same. In a $Li_2S$—$GeS_2$ system, $Li_4GeS_4$ corresponds to the ortho-composition.

Furthermore, when the sulfide solid electrolyte material is formed using a raw material composition containing LiX (X=Cl, Br or I), the proportion of LiX is, for example, preferably in the range of 1 mol % to 60 mol %, more preferably in the range of 5 mol % to 50 mol %, and even more preferably in the range of 10 mol % to 40 mol %. Furthermore, when the sulfide solid electrolyte material is formed using a raw material composition containing $Li_2O$, the proportion of $Li_2O$ is, for example, preferably in the range of 1 mol % to 25 mol %, and more preferably in the range of 3 mol % to 15 mol %.

Furthermore, the sulfide solid electrolyte material may be a sulfide glass, may be a crystallized sulfide glass, or may be a crystalline material obtainable by a solid phase method. Incidentally, a sulfide glass can be obtained by, for example, subjecting a raw material composition to mechanical milling (ball mill or the like). Furthermore, a crystallized sulfide glass can be obtained by, for example, subjecting a sulfide glass to a heat treatment at a temperature higher than or equal to the crystallization temperature. Furthermore, the Li ion conductivity at normal temperature of the sulfide solid electrolyte material is, for example, preferably $1 \times 10^{-5}$ S/cm or higher, and more preferably $1 \times 10^{-4}$ S/cm or higher.

Examples of the shape of the sulfide solid electrolyte material according to the present invention include a granular shape such as a true spherical shape or an elliptical shape, and a thin film shape. When the sulfide solid electrolyte material has the granular shape, the average particle size ($D_{50}$) is, although not particularly limited, preferably 40 μm or less, more preferably 20 μm or less, and even more preferably 10 μm or less. It is because an increase of the filling ratio in the cathode active material layer can be easily promoted. On the other hand, the average particle size is preferably 0.01 μm or more, and more preferably 0.1 μm or more. Incidentally, the average particle size can be determined using, for example, a particle size distribution meter.

The content of the sulfide solid electrolyte material in the electrode active material layer used in the present invention is, for example, preferably in the range of 1% by weight to 90% by weight, and more preferably in the range of 10% by weight to 80% by weight.

The electrode active material layer according to the present invention may further contain at least one of a conductive material and a binding material, in addition to an active material such as the composite active material described above, and a sulfide solid electrolyte material. Examples of the conductive material include acetylene black, Ketjen black, and carbon fibers. Examples of the binding material include fluorine-containing binding materials such as PTFE and PVDF. The thickness of the electrode active material layer may vary depending on the configuration of the intended all solid state battery, but the thickness is, for example, preferably in the range of 0.1 μm to 1000 μm.

2. Solid Electrolyte Layer

Next, the solid electrolyte layer according to the present invention will be explained. The solid electrolyte layer according to the present invention is a layer formed between the cathode active material layer and the anode active material layer, and is a layer containing at least a solid electrolyte material. As described above, when the electrode active material layer contains a sulfide solid electrolyte material, the solid electrolyte material contained in the solid electrolyte layer is not particularly limited as long as the material has ion conductivity, and the solid electrolyte material may be a sulfide solid electrolyte material, or may be a solid electrolyte material other than that. On the other hand, when the electrode active material layer does not contain a sulfide solid electrolyte material, it is preferable that the solid electrolyte layer contain a sulfide solid electrolyte material. Particularly, in the present invention, it is preferable that both the electrode active material layer and the solid electrolyte layer contain a sulfide solid electrolyte material. It is because the effect of the present invention can be sufficiently exhibited. Furthermore, it is preferable that the solid electrolyte material used in the solid electrolyte layer be a sulfide solid electrolyte material only.

Incidentally, in regard to the sulfide solid electrolyte material, since the matters related thereto are similar to the matters described in the section "1. Electrode active material layer" described above, further description will not be repeated here. Furthermore, regarding the solid electrolyte material other than a sulfide solid electrolyte material, the same materials as the solid electrolyte materials used in general all solid state batteries can be used.

The content of the solid electrolyte material in the solid electrolyte layer is, for example, preferably in the range of 10% by weight to 100% by weight, and more preferably in the range of 50% by weight to 100% by weight. Furthermore, the solid electrolyte layer may also contain a fluorine-containing binding agent such as PTFE or PVDF. The thickness of the solid electrolyte layer is, for example, preferably in the range of 0.1 μm to 1000 μm, and more preferably in the range of 0.1 μm to 300 μm.

3. Other Constituents

The all solid state battery of the present invention comprises at least the above-mentioned electrolyte active material layer and solid electrolyte layer. Furthermore, the all solid state battery usually comprises a cathode current collector that performs current collection of the cathode active material layer; and an anode current collector that performs current collection of the anode active material layer. Examples of the material for the cathode current collector include SUS, aluminum, nickel, iron, titanium and carbon, and among them, SUS is preferred. On the other hand, examples of the material for the anode current collector include SUS, copper, nickel and carbon, and among them, SUS is preferred. Furthermore, in regard to factors such as the thickness and shape of the cathode current collector and the anode current collector, it is preferable to appropriately select the factors such as the thickness and shape depending on the use of the all solid state battery, and the like. Furthermore, regarding the battery case used in the present invention, any general battery case for an all solid state battery can be used, and examples include battery cases made of SUS. Furthermore, the all solid state battery of the present invention may also be a battery having a power generating element formed within an insulated ring.

4. All-Solid-State Battery

According to the present invention, when the composite active material described above is used, an increase in the internal resistance between the composite active material and a solid electrolyte material can be suppressed. Furthermore, since the composite active material described above exhibits excellent ion conductivity and electron conductivity, the battery resistance can be reduced. Therefore, an all solid state battery having excellent power output characteristics can be produced. Examples of the all solid state battery of the present invention include a lithium all solid state battery, a sodium all solid state battery, a magnesium all solid state battery and a calcium all solid state battery, and among them, a lithium all solid state battery and a sodium all solid state battery are preferred, while a lithium all solid state battery is particularly preferred. Furthermore, the all solid state battery of the present invention may be a primary battery, or may be a secondary battery, but among others, it is preferable that the all solid state battery be a secondary battery. It is because a secondary battery can be repeatedly charged and discharged, and is useful as, for example, a battery for vehicles. Examples of the shape of the all solid state battery of the present invention include batteries of a coin type, a laminate type, a cylindrical type and a rectangular type.

The internal resistance of the all solid state battery of the present invention is not particularly limited, but the internal resistance is preferably less than 90Ω, and among others, preferably 80Ω or less.

The method for producing an all solid state battery of the present invention is not particularly limited as long as it is a method by which the all solid state battery described above can be obtained, and a method similar to a general method for producing an all solid state battery can be used. An example of the method for producing an all solid state battery may be a method of producing a power generating element by pressing a material that constitutes the cathode active material layer, a material that forms a solid electrolyte layer, and a material that forms an anode active material layer in sequence, accommodating this power generating element in the interior of a battery case, and caulking the battery case.

C. Method for Producing Composite Active Material

Next, the method for producing a composite active material of the present invention will be described.

The method for producing a composite active material of the present invention provides a method for producing a composite active material, the composite active material comprises an active material and a coating layer that is formed on a surface of the active material and contains a carbonaceous material and an ion conductive oxide, in which an elemental carbon concentration of a surface of the coating layer being 17.0 atm % or more, the method comprising steps of: a preparation step of preparing a coating liquid for coating layer containing a compound or compounds that serve(s) as a raw material of the carbonaceous material and a raw material of the ion conductive oxide; a coating film forming step of applying the coating liquid for coating layer on the surface of the active material, and forming a coating film; and a heat treatment step of subjecting the coating film to a heat treatment, and thereby forming the coating layer.

Figure 3:
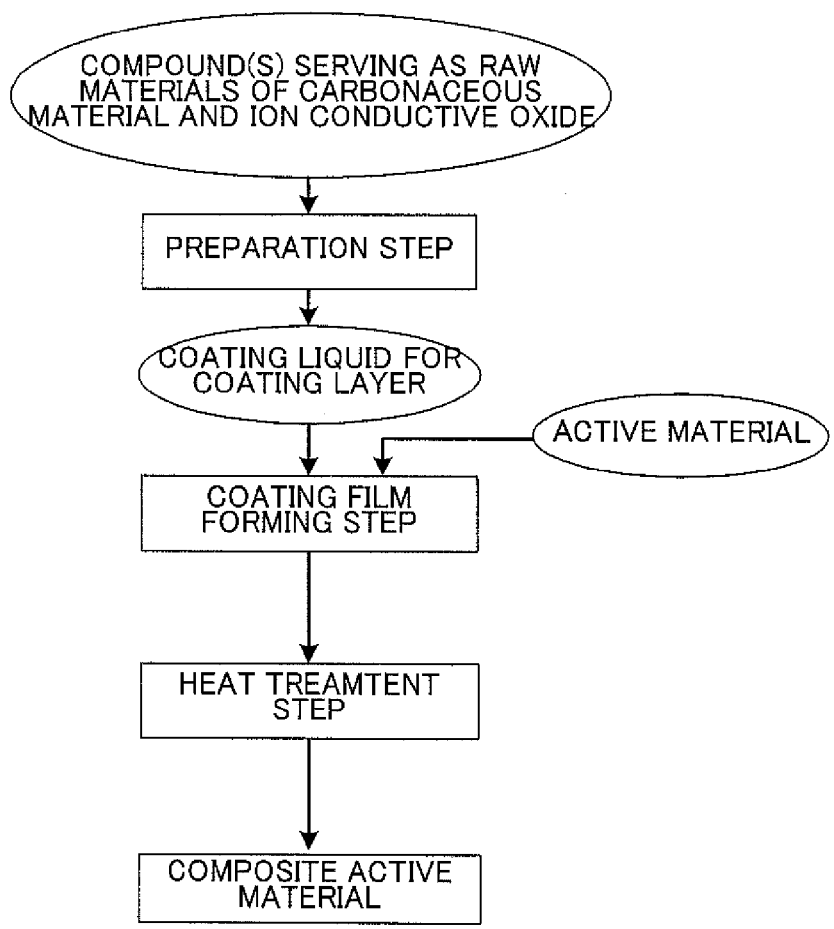
FIG. 3 is a flow chart illustrating an example of a method for producing a composite active material of the present invention.

FIG. 3 is a flow chart illustrating an example of the method for producing a composite active material of the present invention. As illustrated in FIG. 3, in the present invention, a coating liquid for coating layer containing a compound or compounds that serve(s) as a raw material of a carbonaceous material and a raw material of an ion conductive oxide, is prepared (preparation step). Next, a coating liquid for coating layer is applied on the surface of the active material, and thus a coating film is formed (coating film forming step). Next, the coating film is subjected to a heat treatment, and thereby a coating layer is formed (heat treatment step). Thereby, a composite active material having an active material, and a coating layer that is formed on the surface of the active material and contains anion conductive oxide and a carbonaceous material can be obtained.

According to the present invention, since a composite active material containing a carbonaceous material such that the elemental carbon concentration of the coating layer surface would be 17.0 atm % or more can be produced, a composite active material provided with a coating layer having satisfactory electron conductivity can be produced. Therefore, an increase in the internal resistance in an all solid state battery that uses a composite active material obtained by the production method of the present invention, can be suppressed.

Here, as a general method for forming a coating layer on the surface of an active material, a method of utilizing a sol-gel method has been conventionally used. A sol-gel method involves gelling a sol of an alkoxide hydrolysate or the like on the surface of an active material, heating the gel, and thereby forming a coating layer formed of an oxide having ion conductivity. In a conventional sol-gel method, hydrolysis of an alkoxide is allowed to sufficiently proceed by utilizing hydrogenation, or the moisture (humidity) in a solvent or in air.

On the contrary, in the present invention, the water content in the coating liquid for coating layer, or the water content in the atmosphere at the time of carrying out the various processes is adjusted such that the elemental carbon concentration of the coating layer surface would be 17.0 atm % or more. By suppressing the progress of a hydrolysis reaction of an alkoxide thereby, a portion of the components that constitute the coating film remain unhydrolyzed and are carbonized by being heat treated, to form a carbonaceous material, and thus a coating layer containing an ion conductive oxide and a carbonaceous material can be formed.

Hereinafter, the various steps of the method for producing a composite active material of the present invention will be described.

1. Preparation Step

The preparation step according to the present invention is a process for preparing a coating liquid for coating layer containing a compound or compounds that serve(s) as a raw material of the carbonaceous material and a raw material of the ion conductive oxide. Furthermore, the coating liquid for coating layer that is prepared by the present process is usually brought into a sol state by hydrolysis and a polycondensation reaction of a sol-gel solution, that is, the compound(s) described above, and when the polycondensation reaction and aggregation further proceed, a gel state is attained.

The compound or compounds that serve(s) as a raw material of the carbonaceous material and a raw material of the ion conductive oxide used in the coating liquid for coating layer, are not particularly limited as long as the compound or the compounds is/are a compound or compounds having functional groups containing carbon and the elements that constitute the ion conductive oxide. Here, regarding the ion conductive oxide, the matters described in the section "A. Composite active material" described above are similarly applicable.

When the ion conductive oxide is represented by general formula: $Li_xAO_y$, regarding the compound or the compounds that serve(s) as a raw material of the carbonaceous material and a raw material of the ion conductive oxide, a Li-supplying compound and an A-supplying compound can be used. Examples of the Li-supplying compound include Li alkoxides such as ethoxylithium and methoxylithium; lithium acetate, and lithium hydroxide. Furthermore, examples of the A-supplying compound include alkoxides, acetate and hydroxide containing A. Specifically, when the ion conductive oxide is $LiNbO_3$, examples of a Nb-supplying compound include Nb alkoxides such as pentaethoxyniobium and pentamethoxyniobium; niobium acetate, and niobium hydroxide. Incidentally, it is preferable that the compound or the compounds that serve(s) as a raw material of the ion conductive oxide be in a dry state.

The solvent of the coating liquid for coating layer may be any solvent capable of dissolving or dispersing the compounds described above, and usually, anhydrous or dehydrated alcohols are used. Specifically, alcohols such as anhydrous or dehydrated ethanol, anhydrous or dehydrated methanol, and anhydrous or dehydrated propanol can be used. Incidentally, the water content in an anhydrous or dehydrated alcohol solvent is not particularly limited as long as the water content is at a level of being capable of suppressing the progress of a hydrolysis reaction of a compound that serves as a raw material of the Li-containing oxide described above when the coating liquid for coating layer is prepared; however, usually, the water content is preferably 0.005% by weight or less, more preferably 0.0025% by weight or less, and particularly preferably 0.00025% by weight or less. It is because when the water content exceeds the above-described range, there is a possibility that it may be difficult to suppress the progress of the hydrolysis reaction, and there is a possibility that it may be difficult to form a coating layer containing a carbonaceous material.

The content of the compound that serves as a raw material of the Li-containing oxide in the coating liquid for coating layer is appropriately set according to the composition of the coating layer carried by the intended all solid state battery. Furthermore, the method for preparing the coating liquid for coating layer is not particularly limited.

Regarding the atmosphere employed when the coating liquid for coating layer is prepared, there are no particular limitations as long as the atmosphere is an atmosphere in which an elemental carbon concentration of 17.0 atm % or more is attained at the coating layer surface of the composite active material produced by the production method of the present invention. Among others, it is preferable that the atmosphere have a dew-point temperature at a level of being capable of suppressing hydrolysis of the coating liquid for coating layer. Furthermore, a lower dew-point temperature is more preferable. It is because deterioration of the active material caused by water can be prevented. Specifically, it is preferable that the dew-point temperature in the present step be $-2.2°$ C. or lower, among others, in the range of $-80°$ C. to $-2.2°$ C., and particularly in the range of $-30°$ C. to $-2.2°$ C. It is because when the dew-point temperature exceeds the value described above, hydrolysis proceeds in the coating liquid for coating layer, and in the heat treatment step that will be described below, there is a possibility that a required amount of the carbonaceous material may not be obtained.

Furthermore, the gas used in the atmosphere is not particularly limited. For example, the atmosphere may be an inert gas atmosphere such as nitrogen or argon, or may be an oxygen atmosphere containing oxygen.

2. Coating Film Forming Step

The coating film forming step according to the present invention is a step of applying the coating liquid for coating layer on the surface of the active material, and thereby forming a coating film.

In regard to the active material used in the present step, since the matters described in the section "A. Composite active material" described above are similarly applicable, further description will not be repeated here.

The atmosphere employed when the coating liquid for coating layer is not particularly limited as long as it is an atmosphere in which an elemental carbon concentration of 17.0 atm % or more is attained at the coating layer surface of the composite active material produced by the production method of the present invention. In the present step, it is preferable that the atmosphere have a dew-point temperature at a level of being capable of suppressing hydrolysis of the coating liquid for coating layer. On the other hand, when hydrolysis is suppressed, the elemental carbon concentration of the coating layer surface is increased; therefore, in the case of adjusting the elemental carbon concentration to a low level (for example, near 17.0 atm %), the dew-point temperature may be set to be slightly higher. Specifically, it is preferable that the dew-point temperature in the present step be −2.2° C. or lower, among others, in the range of −80° C. to −10° C., and particularly in the range of −50° C. to −30° C. It is because when the dew-point temperature exceeds the above-mentioned values, hydrolysis proceeds in the coating liquid for coating layer or in the coating film during the coating step, and in the heat treatment step that will be described below, there is a possibility that a required amount of carbonaceous material may not be obtained.

Furthermore, the gas used in the atmosphere described above is not particularly limited. For example, the atmosphere may be an inert gas atmosphere such as nitrogen or argon, or may be an oxygen atmosphere containing oxygen.

Furthermore, the method of applying the coating liquid for coating layer on the surface of the active material is not particularly limited, and examples include a fluidized bed coating method; a method of immersing the active material in the coating liquid for coating layer and then drying the solvent; and a method of using a spray dryer. In the present step, among them, a fluidized bed coating method is preferably used. Here, the fluidized bed coating method is a technique for film coating using a fluidized bed granulation/coating apparatus, and uniform coating can be provided by repeating spraying of a liquid to particles and drying the liquid. Examples of such an apparatus include MULTIPLEX™ manufactured by Powrex Corp., and FLO-COATER™ manufactured by Freund Corp. Furthermore, in regard to the spraying and drying in a fluidized bed granulation/coating apparatus, in order to bring the active material into a fluidized state, usually a gas stream is generated in a fluidized bed vessel, and if necessary, a rotor or the like is rotated; however, the conditions for these gas streams and the conditions of rotation of a rotor may be appropriately set, and are not particularly limited. Usually, in order to perform drying of the coating liquid for coating layer by means of a gas stream in the fluidized bed vessel, from the viewpoint of drying the coating liquid for coating layer efficiently, the gas stream temperature (gas stream temperature) in the vessel is preferably adjusted to the range of 40° C. to 100° C.

Furthermore, the conditions for the spraying (application) of the coating liquid for coating layer are also not particularly limited, and the rate of spraying and the like can be appropriately set.

The film thickness of the coating film is appropriately set according to the thickness of an intended coating layer.

3. Heat Treatment Step

The heat treatment step according to the present invention is a process of forming the coating layer by subjecting the coating film to a heat treatment.

In the present step, by subjecting the coating film formed on the surface of the cathode active material to a heat treatment in the atmosphere described above, the components constituting the coating film are oxidized, and thus a composite active material provided with a coating layer containing an ion conductive oxide can be obtained. Furthermore, a portion of the components that constitute the coating film can be carbonized by performing a heat treatment in the atmosphere described above, and thus a composite active material provided with a coating layer containing a carbonaceous material in addition to the ion conductive oxide can be obtained.

The heat treatment temperature in the present step is not particularly limited as long as an intended coating layer can be formed. For example, the heat treatment temperature is preferably in the range of 300° C. to 500° C., more preferably in the range of 350° C. to 450° C., and particularly preferably in the range of 350° C. to 400° C. It is because when the heat treatment temperature is lower than the range described above, a sufficient heat treatment cannot be carried out, and there is a possibility that an intended coating layer may not be obtained; on the other hand, when the heat treatment temperature is higher than the range described above, there is a possibility that deterioration of the active material and the like may occur.

The atmosphere employed at the time of performing a heat treatment is not particularly limited as long as the atmosphere has a dew-point temperature at a level of being capable of suppressing hydrolysis of the coating liquid for coating layer such that the elemental carbon concentration of the coating layer surface of the composite active material produced by the production method of the present invention would be 17.0 atm % or more. Specifically, it is preferable that the dew-point temperature in the present step be preferably −2.2° C. or lower, among others, in the range of −80° C. to −10° C., and particularly in the range of −50° C. to −30° C. The gas for such an atmosphere may be, for example, air.

The heat treatment time in the present step is not particularly limited as long as an intended coating layer can be formed, and specifically, the heat treatment time is preferably 0.5 hour or longer, among others, more preferably in the range of 0.5 hour to 48 hours, and particularly preferably in the range of 1 hour to 20 hours. Furthermore, in the range described above, a longer heat treatment time is more preferable. It is preferable that a large portion of the components that constitute the coating film can be carbonized, and electron conductivity of the composite active material can be suitably enhanced.

The heat treatment method for the present step is not particularly limited as long as it is a method capable of performing a heat treatment in the atmosphere described above, and for example, a method of using a calcination furnace may be used. The calcination furnace is not particularly limited as long as a heat treatment can be carried out in an intended atmosphere, but for example, a muffle furnace can be suitably used.

4. Others

According to the present invention, a composite active material having a coating layer formed on the surface of an active material by a sol-gel method, can be obtained by carrying out the processes described above. Since a sol-gel method is a wet type process that uses a precursor of a solution system, a coating layer that covers a larger area of the surface of the active material can be easily formed. Furthermore, since a sol-gel method is a chemical method, as compared with a method of coating by means of a mechanical physical force, such as a mechanical milling method, a composite active material in which the bonding between the active material and the coating layer is strong, and the coating layer formed to cover the surface of the active material is not easily detached, can be obtained.

Incidentally, the present invention is not intended to be limited to the embodiments described above. The above-described embodiments are only for illustrative purposes, and any embodiment that has substantially the same constitution as the technical idea described in the claims of the present invention and provides similar operating effects is included in the technical scope of the present invention.

EXAMPLES

Hereinafter, the present invention will be more specifically described by way of Examples and Comparative Example.

Example 1

Preparation of Coating Liquid for Coating Layer

Preparation of a coating liquid for coating layer was carried out in a nitrogen atmosphere (dew-point temperature: −2.2° C.) by the following procedure. First, ethoxylithium (manufactured by Kojundo Chemical Laboratory Co., Ltd.) was dissolved and uniformly dispersed in dehydrated ethanol (manufactured by Wake Pure Chemical Industries, Ltd.), and then pentaethoxyniobium (manufactured by Kojundo Chemical Laboratory Co., Ltd.) was introduced therein so that the elemental ratio of lithium and niobium would be 1:1. Stirring was performed until the mixture was in a uniformly mixed state. The feed amount of ethoxylithium was adjusted such that the solid content ratio of the solution would be 6.9 wt %.

Production of Composite Active Material

Sprayed was 680 g of the coating liquid for coating layer to 1 kg of cathode active material $LiNi_{1/3}Mn_{1/3}Co_{1/3}O_2$ (manufactured by Nichia Corp.) using a coating apparatus MP-01™ (Powrex Corp.), and thus a coating film was formed on the cathode active material surface. The operating conditions for the coating apparatus were as follows: inspiration gas: nitrogen (dew-point temperature: −40° C.), inspiration temperature: 80° C., amount of inspired air: 0.3 m³/h, speed of rotor rotation: 300 rpm, and rate of spraying: 1.5 g/min.

After completion of coating, the coating film was heat treated in an air atmosphere (dew-point temperature: −40° C.) at 350° C. for 20 hours, and thereby, a coating layer was formed. A composite active material was obtained by carrying out the procedure described above.

Production of Sulfide Solid Electrolyte Material $Li_2S$ (Nippon Chemical Industrial Co., Ltd.) and $P_2S_5$ (Sigma-Aldrich Co.) were used as starting raw materials. Subsequently, $Li_2S$ and $P_2S_5$ were weighed in a glove box under an Ar atmosphere (dew point: −70° C.), such that a molar ratio of $75Li_2S \cdot 25P_2S_5$ ($Li_3PS_4$, ortho-composition) would be obtained, and the mixture was mixed in an agate mortar for 5 minutes to obtain 2 g of a raw material composition ($Li_2S$=0.7656 g, $P_2S_5$=1.2344 g). Introduced was 2 g of this raw material composition into a container (45 cc, manufactured by $ZrO_2$) of a planetary ball mill, dehydrated heptane (water content: 30 ppm or less, 4 g) was introduced thereto, $ZrO_2$ balls (φ=5 mm, 53 g) were further introduced thereto, and the container was completely sealed (Ar atmosphere). This container was mounted in a planetary ball mill machine (P7™ manufactured by Fritsch Japan Co., Ltd.), and mechanical milling was performed for 40 hours at a speed of bench rotation of 370 rpm. Subsequently, a sample thus obtained was dried in a vacuum, and thus a glassy sulfide solid electrolyte material was obtained.

Production of all Solid State Battery

The composite active material and the sulfide solid electrolyte material were introduced into heptane at a ratio of 6:4 (volume ratio), and 3% (weight ratio) of VGCF (manufactured by Showa Denko K. K.) as a conduction aid, and 0.7% (weight ratio) of butylene rubber (manufactured by JSR Corp.) as a binder were introduced thereto, to thereby prepare a cathode slurry. The cathode slurry was dispersed using an ultrasonic homogenizer, subsequently the slurry was applied on an aluminum foil and dried for 30 minutes at 100° C., and the coated aluminum foil was punched to a size of 1 cm². This was used as a cathode side electrode.

An anode active material (layered carbon) and the sulfide solid electrolyte material were introduced into heptane at a ratio of 6:4 (volume ratio), and 1.2% (weight ratio) of butylene rubber as a binder was introduced therein, to prepare an anode slurry. The anode slurry was dispersed using an ultrasonic homogenizer, subsequently the anode slurry was applied on a copper foil and dried for 30 minutes at 100° C., and then the coated copper foil was punched to a size of 1 cm². This was used as an anode side electrode.

Introduced was 64.8 mg of the sulfide solid electrolyte material described above into a cylindrically shaped ceramic having an internal diameter cross-sectional area of 1 cm², the electrolyte material was spread smoothly, and the system was pressed at a pressure of 1 ton. Thus, a solid electrolyte layer was formed. On both surfaces thereof, the cathode side electrode and the anode side electrode were placed, the system was pressed at a pressure of 4.3 ton for 1 minute, subsequently a stainless steel rod was introduced into each of the two electrodes, and the assembly was bound at a pressure of 1 ton to obtain a battery.

An all solid state battery was obtained by the procedure described above.

Example 2

A composite active material and an all solid state battery were obtained in the same manner as in Example 1, except that the atmosphere employed at the time of preparing the coating liquid for coating layer was changed to a nitrogen atmosphere (dew-point temperature: −5.4° C.).

Example 3

A composite active material and an all solid state battery were obtained in the same manner as in Example 1, except that a heat treatment after the formation of the coating film was carried out for 5 hours.

Comparative Example

A composite active material and an all solid state battery were obtained in the same manner as in Example 1, except that the atmosphere employed when the coating liquid for coating layer was prepared was changed to a nitrogen atmosphere (dew-point temperature: 0.9° C.).

Evaluation

Figure 4:
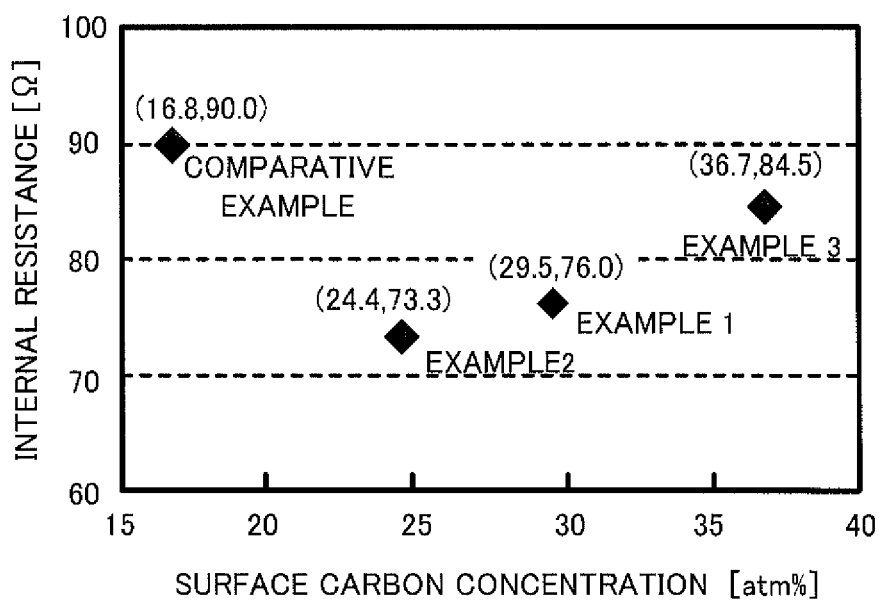
FIG. 4 is a graph illustrating the relation between the surface carbon concentrations (atm %) of composite active materials of Examples 1 to 3 and Comparative Example, and the internal resistance (Ω) of all solid state batteries.

Each of the batteries of Examples 1 to 3 and Comparative Example was charged to a voltage of 4.55 V, and then discharged to 2.5 V, and the internal resistance was measured at a current value of a C-rate of 9 C at 3.6 V. The results are presented in FIG. 4. Incidentally, FIG. 4 is a graph illustrating the relation between the surface carbon concentrations (atm %) of the composite active materials of Examples 1 to 3 and Comparative Example, and the internal resistances (Ω) of the all solid state batteries.

REFERENCE SIGNS LIST 1 composite active material
2 active material
3 coating layer
4 solid electrolyte material
11 cathode active material layer
12 anode active material layer
13 solid electrolyte layer
10 power generating element

The invention claimed is:

1. A method for producing a composite active material that is comprised of an active material and a coating layer, wherein the coating layer is formed on a surface of the active material and is comprised of a carbonaceous material and an ion conductive oxide, the method comprising:
 a preparation step of preparing a coating liquid containing at least one alkoxide compound that serves as a raw material for the carbonaceous material and a raw material for the ion conductive oxide;
 a coating film forming step of applying the coating liquid on the surface of the active material to thereby form a coating film on the surface; and
 a heat treatment step of subjecting the coating film to a heat treatment to thereby form the coating layer, wherein
  a thickness of the coating layer is in a range of 2 nm to 100 nm,
 each of the preparation, coating film forming, and heat treatment steps is carried out in an atmosphere, and
 a water content in the coating liquid and a water content in an atmosphere of each step is adjusted to suppress hydrolysis of the alkoxide and to make a surface of the coating layer have an elemental carbon concentration be in a range of 17.0 atm % to 36.7 atm %.

2. The method according to claim 1, wherein a dew-point temperature of the atmosphere of the preparation step is −2.2° C. or lower.

3. The method according to claim 2, wherein a dew-point temperature of the atmosphere of the coating film forming step is −2.2° C. or lower.

4. The method according to claim 3, wherein a dew-point temperature of the atmosphere of the heat treatment step is −2.2° C. or lower.

5. The method according to claim 2, wherein a dew-point temperature of the atmosphere of the heat treatment step is −2.2° C. or lower.

6. The method according to claim 1, wherein a dew-point temperature of the atmosphere of the coating film forming step is −2.2° C. or lower.

7. The method according to claim 1, wherein a dew-point temperature of the atmosphere of the heat treatment step is −2.2° C. or lower.

8. The method according to claim 1, wherein the water content in the coating liquid is 0.005% by weight or less.

* * * * *